UNITED STATES PATENT OFFICE.

HENRY H. SMITH, OF WILMINGTON, N. C., ASSIGNOR OF TWO-THIRDS TO ANDREW SMITH AND LUDVIG HANSEN, BOTH OF SAME PLACE.

PROCESS OF MAKING INSECTICIDES, &c.

SPECIFICATION forming part of Letters Patent No. 338,110, dated March 16, 1886.

Application filed June 11, 1885. Serial No. 168,379. (Specimens.)

*To all whom it may concern:*

Be it known that I, HENRY H. SMITH, a citizen of the United States of America, residing at Wilmington, in the county of New Hanover and State of North Carolina, have invented certain new and useful Improvements in Processes of Making Insecticides, Germicides, Disinfectants, &c., of which the following is a specification.

This invention consists in mainly treating wood-tar, wood-tar oil, or any of the products obtained by distillation of wood, but preferably wood-tar oil, with an alkali, whereby it is rendered soluble, and thus fitted for use as an insecticide or germicide, a disinfectant, an antiseptic, &c.

The preferable way of producing the article sought by my invention is as follows: I take one hundred gallons of wood-tar oil and thoroughly mix with the same, by agitation, one-third of the quantity of alkali (soda or potash) of a strength not less than 24° Baumé. After the thorough agitation and mixing it is allowed to settle, when it separates into three layers, the upper layer consisting of insoluble hydrocarbon, the bottom layer of the excess of alkali, while the middle layer forms the object sought by this treatment of the oil, and which is drawn off and bottled for use.

The material thus procured will be found to possess many very valuable qualities. When mixed with water in the proportion of one to eighty, it will be found to be very superior sheep-dip, and as an insecticide for plants it will be found to be very excellent when mixed with water at the rate of from three to five teaspoonfuls of the oil to the gallon of water. Although non-poisonous to men or animals, it will positively destroy cabbage, cotton, and tobacco worms, and is fatal to all insect life. It will cure scab, ring-worm, itch, and most other similar complaints, and will prove very useful in treating a variety of diseases to which animals are subject—such as foot-rot, pleuro-pneumonia, foot and mouth diseases, &c. Besides this, it will be found to be an excellent disinfectant and antiseptic, preventing contagion and destroying the germs of many diseases.

I have found that the addition of poisonous powders—such as paris-green or London purple—to the compound in the proportion of from two to four pounds of either of these materials to the barrel of compound will greatly increase its efficiency when used in destroying cotton and other worms, and that the two combined will have a greater effect than the two used separately, from which I infer that the compound has a strengthening effect upon the other materials that aids in their destructive action.

I am aware that it is not new to treat petroleum and other oils with alkali, and that wood-tar is known as an antiseptic and disinfectant.

I am also aware of the English Patent No. 2,269 of 1870, in which it is proposed to saturate clay or lime with carbolic acid, and then reduce the same to powder, and make no claim to any such compound; but I believe I am the first to treat wood-tar or its products with an alkali, and thus make a soluble material fitted for the services herein set forth.

Although, as before stated, I prefer tar-oil, as it has especial advantages for my purposes, yet I do not limit myself to its use, as any of the products of wood distillation may be substituted therefor without departing from the spirit of my invention.

No claim is here made to the uses of paris green or London purple in connection with my compound, as this will form the subject-matter of a separate application. I make no claim herein to the product of my process.

What I claim as new is—

The process herein described of producing a soluble material from tar-oil, consisting in, first, mixing with the same about one-third the quantity of potash; secondly, allowing the same to settle, and, thirdly, separating the soluble material from the insoluble hydrocarbon and the excess of potash.

In testimony whereof I affix my signature, in presence of two witnesses, this 8th day of June, 1885.

HENRY H. SMITH.

Witnesses:
HANS A. KURE,
ALEX. S. HEIDE.